US007607097B2

(12) United States Patent
Janakiraman et al.

(10) Patent No.: US 7,607,097 B2
(45) Date of Patent: Oct. 20, 2009

(54) TRANSLATING EMOTION TO BRAILLE, EMOTICONS AND OTHER SPECIAL SYMBOLS

(75) Inventors: Janani Janakiraman, Austin, TX (US); Cristi Nesbitt Ullmannn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 10/671,081

(22) Filed: Sep. 25, 2003

(65) Prior Publication Data

US 2005/0069852 A1 Mar. 31, 2005

(51) Int. Cl.
*G06F 3/00* (2006.01)
*G06F 3/048* (2006.01)

(52) U.S. Cl. ...................................................... 715/753

(58) Field of Classification Search ................. 434/236; 709/250, 238; 715/753, 763, 758, 759; 704/277
See application file for complete search history.

(56) References Cited

U.S. PATENT DOCUMENTS

| 5,252,951 | A | | 10/1993 | Tannenbaum et al. | ....... | 345/156 |
|---|---|---|---|---|---|---|
| 5,774,591 | A | | 6/1998 | Black et al. | ................. | 382/236 |
| 5,812,126 | A | * | 9/1998 | Richardson et al. | ......... | 715/741 |
| 5,880,731 | A | * | 3/1999 | Liles et al. | ................... | 715/758 |
| 5,977,968 | A | * | 11/1999 | Le Blanc | ..................... | 715/706 |
| 5,995,924 | A | | 11/1999 | Terry | ............................ | 704/207 |
| 6,088,040 | A | | 7/2000 | Oda | ........................... | 345/473 |
| 6,128,003 | A | | 10/2000 | Smith | ........................... | 345/157 |
| 6,232,966 | B1 | * | 5/2001 | Kurlander | .................... | 715/764 |
| 6,256,033 | B1 | | 7/2001 | Nguyen | ........................ | 345/863 |
| 6,404,438 | B1 | * | 6/2002 | Hatlelid et al. | ............... | 345/473 |
| 6,522,333 | B1 | * | 2/2003 | Hatlelid et al. | ............... | 345/474 |
| 6,590,604 | B1 | | 7/2003 | Tucker et al. | ............. | 348/14.13 |
| 6,876,728 | B2 | * | 4/2005 | Kredo et al. | .............. | 379/88.17 |
| 6,966,035 | B1 | * | 11/2005 | Suess et al. | ................... | 715/753 |
| 7,039,676 | B1 | * | 5/2006 | Day et al. | .................... | 709/204 |
| 7,076,430 | B1 | * | 7/2006 | Cosatto et al. | ............... | 704/275 |
| 7,089,504 | B1 | * | 8/2006 | Froloff | ........................ | 715/839 |

(Continued)

FOREIGN PATENT DOCUMENTS

| NL | WO 02/39371 A2 | 5/2002 |
|---|---|---|
| NL | WO 02/42909 A1 | 5/2002 |
| NL | WO 02/099784 A1 | 12/2002 |

OTHER PUBLICATIONS

"Beyond Voice Recognition: Facial Expression Decoding", Technical Insights Alert, Dec. 31, 1999, 3 pages.

(Continued)

*Primary Examiner*—Steven B Theriault
(74) *Attorney, Agent, or Firm*—Robert H. Frantz; Herman Rodriguez

(57) ABSTRACT

A method for incorporating emotional information in a communication stream by receiving an emotional state indicator indicating an emotional state of a presenter in a communication session, retrieving a cultural profile for the presenter, retrieving a plurality of cultural profiles corresponding to each of several recipients in the communication session, for each recipient, translating the emotional state indicator into a corresponding emoticon according to a difference between the cultural profile of the presenter and the cultural profile of each recipient, merging the translated emoticon into a copy of the communication session, and presenting communication session and merged translated emoticon to each recipient.

3 Claims, 9 Drawing Sheets

U.S. PATENT DOCUMENTS

| | | | | |
|---|---|---|---|---|
| 7,124,164 | B1* | 10/2006 | Chemtob | 709/204 |
| 7,136,818 | B1* | 11/2006 | Cosatto et al. | 704/275 |
| 2001/0029455 | A1* | 10/2001 | Chin et al. | 704/277 |
| 2001/0036860 | A1* | 11/2001 | Yonezawa | 463/30 |
| 2002/0054072 | A1* | 5/2002 | Hayes-Roth | 345/727 |
| 2002/0101505 | A1* | 8/2002 | Gutta et al. | 348/14.07 |
| 2002/0140732 | A1* | 10/2002 | Tveskov | 345/763 |
| 2002/0194006 | A1* | 12/2002 | Challapali | 704/276 |
| 2003/0002633 | A1* | 1/2003 | Kredo et al. | 379/88.08 |
| 2003/0090518 | A1* | 5/2003 | Chien et al. | 345/758 |
| 2004/0001090 | A1* | 1/2004 | Brown et al. | 345/752 |
| 2004/0111272 | A1* | 6/2004 | Gao et al. | 704/277 |
| 2004/0143430 | A1* | 7/2004 | Said et al. | 704/2 |
| 2004/0179039 | A1* | 9/2004 | Blattner et al. | 345/758 |
| 2004/0237759 | A1* | 12/2004 | Bill | 84/668 |
| 2005/0169446 | A1* | 8/2005 | Randall et al. | 379/93.23 |
| 2005/0206610 | A1* | 9/2005 | Cordelli | 345/156 |
| 2006/0074689 | A1* | 4/2006 | Cosatto et al. | 704/275 |
| 2006/0143647 | A1* | 6/2006 | Bill | 725/10 |
| 2007/0033254 | A1* | 2/2007 | AlHusseini et al. | 709/205 |

OTHER PUBLICATIONS

"Expression Glasses: A Wearable Device for Facial Expression Recognition", J. Scheirer, et al., MIT Media Laboratory, May 15, 1999, 2 pages.

"Facial Expression Analysis", J. Cohn, et al., Sep. 12, 1997, 3 pages.

"Product Brief: FaceIT [TM] Software Developer Kits", Identix Corporation, Minnetonka, MN, 2 pages.

"Facial Expression Recognition using Neural Networks" by Ben Wong, downloaded from http://www.cs.cornell.edu/boom/2001sp/Wong.%20B/Untitled-3.htm on Aug. 15, 2003, 8 pages.

"Learning Bayesian Network Classifiers for Facial Expression Recognition using Both Labeled and Unlabeled Data", by Ira Cohen, et al., 7 pages.

"Spectral Emphasis as an Additional Source of Information in Accent Detection", by Mattias Heldner, 4 pages.

"Abstract: Robust Facial Expression Recognition Using a State-based Model of Spacially-Localised Dynamics" by F. Bourel, et al., 1 page.

"Interpretations" DataFace, Psychology, Appearance and Behavior of the Human Face.

"Comprehensive Database for Facial Expression Analysis," Takeo Kanade, J Jeffrey F. Cohn, and Yingli Tian.

"Bimodal Expression of Emotion by Face and Voice", by Jeffrey F. Cohn and Gary S. Katz.

"Recognizing Action Units for Facial Expression Analysis", by Yingli Tian, Intelligence, vol. 23, No. 2, Feb. 2001.

Tidwell, Charles H., Ph.D.; "Non-verbal Communication Modes", retrieved on Oct. 30, 2008 from http://www2.andrews.edu/~tidwell/bsad560/NonVerbal.html.

Virtual Tourist; "Sofia Travel Guide", retrieved on Oct. 30, 2008 from http://www.virtualtourist.com/travel/Europe/Bulgaria.

* cited by examiner (c)

(b)

(a)

TRANSLATING EMOTION TO BRAILLE, EMOTICONS AND OTHER SPECIAL SYMBOLS

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This invention relates to technologies for enabling emotional aspects of broadcasts, teleconferences, presentations, lectures, meetings and other forms of communication to be transmitted to a receiving user in a form comprehendable by the user.

2. Background of the Invention

Human-to-human communication is a vital part of everyday life, whether it be a face-to-face conversation such as a business meeting, a one-way communication such as a television or radio broadcast, or a virtual meeting such as an online video conference.

During such a communication session, typically there is a speaker presenting some material or information, and there are one or more participants listening to and/or viewing the speaker.

As shown in FIG. 1, in a one-way communication session (1), such as a news broadcast or a lecture, the speaker (2) remains the same over a period of time, and the participants (3, 4, 5) are not usually allowed to assume the role of speaker.

In a multi-way communication session (10), however, such as a telephone conference call, participants (12, 13, 15) may, in a turn order determined by culture and tradition, periodically assume the speaker role, at which time the previous speaker (12) becomes a listening or viewing participant. During these "rotating" or exchanging periods of "having the floor", each participant may offer additional information, arguments, questions, or suggestions. Some schemes for transferring the speaker role are formal, such as "Robert's Rules of Order" or "Standard Parliamentary Procedure", while others are ad hoc such as less formal meeting customs, and still others are technical in nature (e.g. in a teleconference, the current speaker may be given the microphone until he or she has been silent for a certain time period).

Information flow (20) during communication sessions such as these can be broken into three areas of information—what is being spoken by the speaker (22), what is being shown (e.g., a slide or graphic being displayed, a diagram on a white board, etc.) (21), and the facial and body gestures (23) of the current speaker, as illustrated in FIG. 2.

For example, a new speaker may be disagreeing with a previously made point by saying "Right, that would be a great idea", but his or her actual voice and intonation would not indicate the disagreement (e.g. it would sound like a sincere agreement). Rather, his or her body or facial movements may indicate that in reality there is no agreement. In another example, a speaker's hand movements may indicate a phrase is indicated as a question, while his or her voice intonation does not carry the traditional 111t at the end of the phrase to indicate it is a question.

In two common scenarios, interesting challenges and loss of information during such communication sessions occurs:

(a) when normal participants are remotely connected to a communication session but are not able to interpret facial or body gestures of the current speaker, and (b) when physically challenged participants may not be able to interpret facial or body gestures even when physically near the current speaker.

In the first instance, "body language" of the current speaker may not be transmitted to a "normal" participant, such as in a voice-only teleconference, or during a video conference or television broadcast which presents only the face of the speaker. In the second instance, body language of the current speaker may not be available to a participant due to a disability of the participant such as blindness, deafness, etc.

Some adaptive technologies already exist which can convert the spoken language and multimedia presentations into formats which a disabled user can access, such as Braille, tactile image recognition, and the like. However, just conveying the presentation portion of the information and the speaker's words to the user does not provide the complete information conveyed during a conference. The emotion, enthusiasm, concern, or uncertainty as expressed by the speaker via the voice tone, and body language is lost using only these systems.

Additionally, the speaker cannot see the responsive body language of the participants to his or her message, and thus cannot adjust the presentation to meet the needs of the intended audience. For example, during a "live" presentation, a speaker may read the body language and facial expressions of several attendees that they are not convinced by the points or arguments being offered. So, the speaker may dwell on each point a bit longer, being a bit more emphatic about their factuality, etc. But, in a teleconference, this apparent disagreement may be lost until the speaker opens the conference up for questions.

In written communications such as e-mail, an attempt to provide this non-verbal information has evolved as "emoticons", or short text combinations which indicate an emotion. For example, if an email author wishes to write a sarcastic or cynical statement in text, it may not be properly interpreted by the reader as no facial expressions or verbal intonation is available to convey the irony by the sender. So, a "happy face" emoticon such as the combination :-) may be included following the cynical statement as follows:

Right, that sounds like a GREAT idea!! :-)

Other emoticons can be used to convey similar messages, such as:

I'm really looking forward to that! :-(

Therefore, there is a need in the art for transmitting and conveying supplementary communications information from a human presenter to one or more recipients such as facial expressions and body language contemporary with the traditional transmission of aural, visual and tactile information during a communication session such as a teleconference, video conference, or broadcast.

BRIEF DESCRIPTION OF THE DRAWINGS

Preferred embodiments of the present invention will now be described by way of example only, with reference to the accompany drawings in which.

SUMMARY OF THE INVENTION

Figure 1:
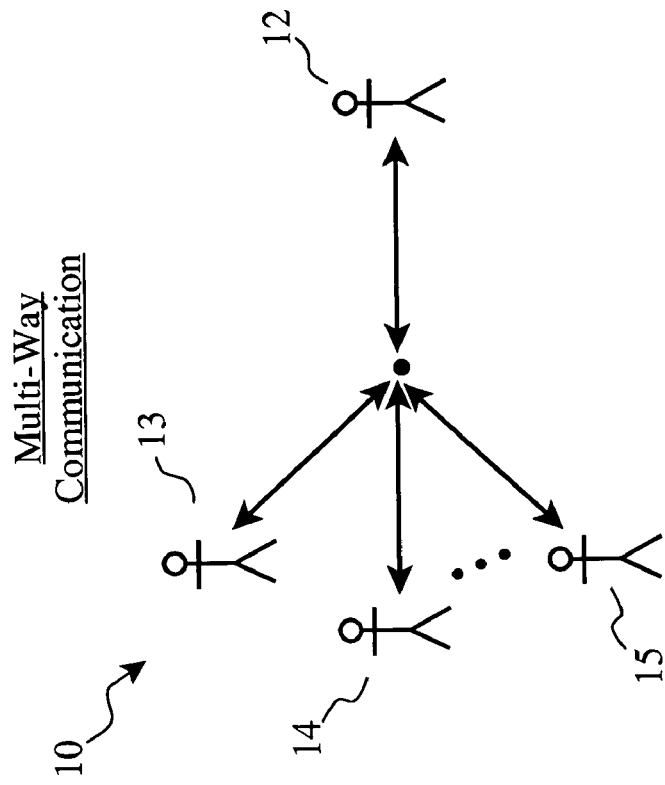
FIG. 1 depicts one-way and multi-way communications sessions such as meetings, conference calls, and presentations.
Figure 1:
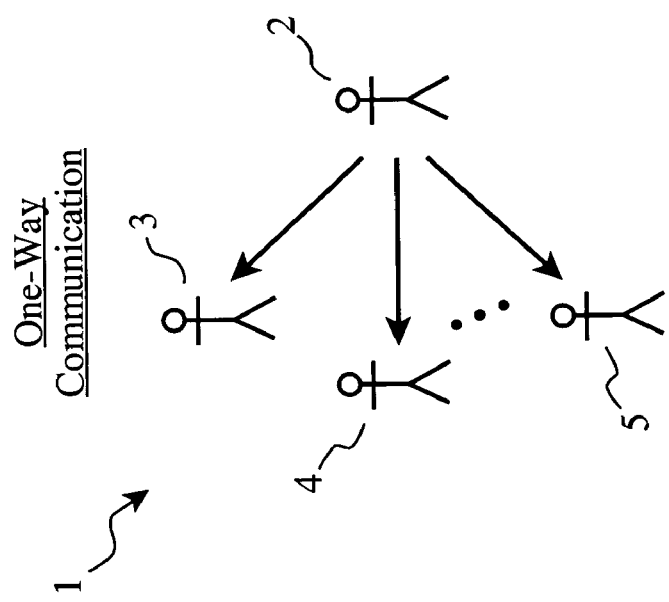
Figure 2:
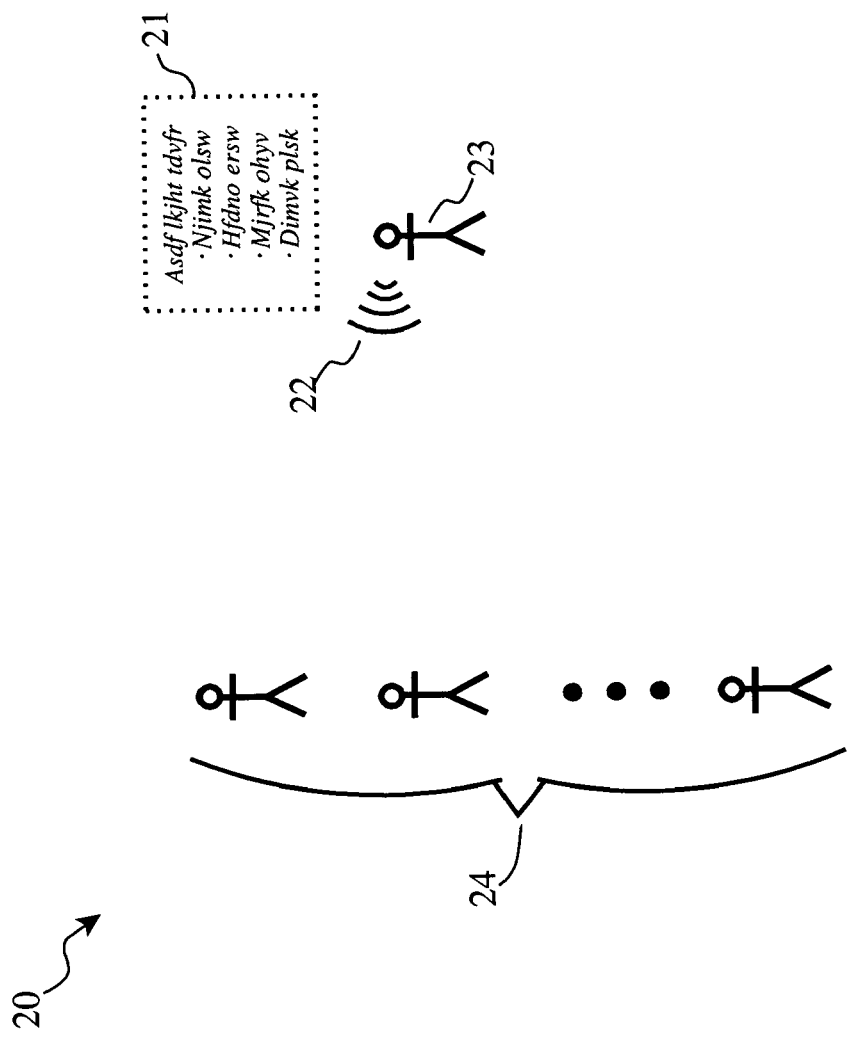
FIG. 2 shows three areas of information conveyed during communication including what is being spoken by the speaker, what is being shown, and the facial and body gestures of the current speaker.

People participating in a conference, discussion, or debate can express emotions by various mechanisms like voice pitch, cultural accent of speech, emotions expressed on the face and certain body signals (like pounding of a fist, raising a hand, waving hands). The present invention aggregates the emotion expressed by the members participating in the conference, discussion, debate with the traditional forms of communication information such as text, speech, and visual graphics, in order to provide a more complete communication medium to a listener, viewer or participant. The emotional content is presented "in-line" with the other multimedia information (e.g. talk or a powerpoint presentation) being presented as part of the conference. The present invention is useful with a variety of communication session types including, but not limited to, electronic mail, online text chat rooms, video conferences, online classrooms, captioned television broadcasts, multimedia presentations, and open captioned meetings. In summary, the invention receives an emotional state indicator output from automatic emotional content analysis of a communication session indicating an emotional state of a presenter of said communication session, retrieves a cultural profile for the presenter, retrieves a plurality of cultural profiles corresponding to each of a plurality of recipients to which the communication session is directed, then, for each recipient to which the communication session is directed, translates the emotional state indicator into a corresponding emoticon according to a difference between the cultural profile of the presenter and the cultural profile of the recipient, merges the translated emoticon into a copy of the communication session, and presents the communication session and merged translated emoticon to each of the corresponding recipients.

DESCRIPTION OF THE INVENTION

The present invention preferrably interfaces to one of many available facial expression recognition, body gesture recognition, and speech recognition systems available presently. We will refer to these systems collectively as "emotional content analyzers", as many of them provide outputs or "results" of their analysis in terms of emotional characteristics of a subject person, such as "happy", "confused", "angry", etc. Such systems, while still evolving, have proven their viability and are on the forefront of computing technology.

Conferences and symposiums for those deeply involved in the research and applications of such technologies are regularly held, such as the Second International Workshop on Recognition, Analysis and Tracking of Faces and Gestures in Real-time Systems held in conjunction with ICCV 2001, Vancouver, Canada, in July of 2001.

Many different approaches of facial expression recognition have been suggested, tried, and discussed, including use of learning Bayesian Classifiers, fractals, neural networks, and State-Based Model of Spatially-Localised Facial Dynamics. Some methods and techniques of facial expression processing have been patented, such as U.S. Pat. No. 6,088,040 to Oda, et al. and U.S. Pat. No. 5,774,591 to Black, et al.

In general, however, these systems all provide a function which receives an image, such as an electronic photograph of a subject's face, or series of images, such as a digital video clip of a subject's face, as their input, and they determine one or more emotions being expressed on the face of the subject. For example, a face with up-turned edges of the mouth may be classified as "happy" or "pleased", with a rumpled brow as "angry" or "confused", and with a nodding head as "agreeing" or "disagreeing" based upon direction of the nod.

Likewise, body movement and gesture recognition is also an evolving technology, but has reached a level of viability and is the subject of many papers, patents and products. Disclosures such as U.S. Pat. No. 6,256,033 to Nguyen; U.S. Pat. No. 6,128,003 to Smith, et al., and U.S. Pat. No. 5,252,951 to Tannenbaum, et al., teach various techniques for using computers to recognize hand or body gestures.

Similarly to the facial expression recognition systems, these systems typically provide a function which receives an electronic image of a subject's body or body portion (e.g. entire body, hands-only, etc.), or a series of images, such as a digital video clip, as their input. These systems determine one or more emotions being expressed by the subject's body movements. For example, an image or video clip containing a subject shrugging his shoulders would be determined to be an emotion of not knowing an answer or not being responsible for the subject matter being discussed. Image analysis can also be performed on images taken in quick succession (e.g. short video clips) to recognize specific body language like the pounding of a fist, waving of a hand, or nodding to signify approval or disapproval for ideas or agreement and disagreement.

As such, techniques exist that can perform an image analysis on the facial expression and body movements of a subject person to find out what a person is likely feeling, such as happiness, sadness, uncertainty, etc.

Additionally, advanced speech analysis can relate pitch of the voice to emotions. For example, U.S. Pat. No. 5,995,924 to Terry discloses a technique for computer-based analysis of the pitch and intonation of an audible human statement to determine if the statement is a question or an acknowledgment. Studies and experiments in the fields of linguistics and computer-based speech recognition suggest that some techniques such as spectral emphasis may be used to detect an "accent" within a speech stream, which can be useful to determine emphasized concepts or words in the speech stream, and even cultural dependencies of the speech. Speed analysis systems typically receive a series of digital audio samples representing an audio clip of a subject person's speech. These are then analyzed using a number of techniques known in the art to determine actual words, phrases, and emphasis contained in the speech.

The present invention is preferably realized as software functions or programs in conjunction with one or more suitable computing platforms, although alternative embodiments may include partial or full realization in hardware as well. As such, computing platforms in general are described in the following paragraphs, followed by a detailed description of the specific methods and processes implemented in software.

Computing Platforms in General

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
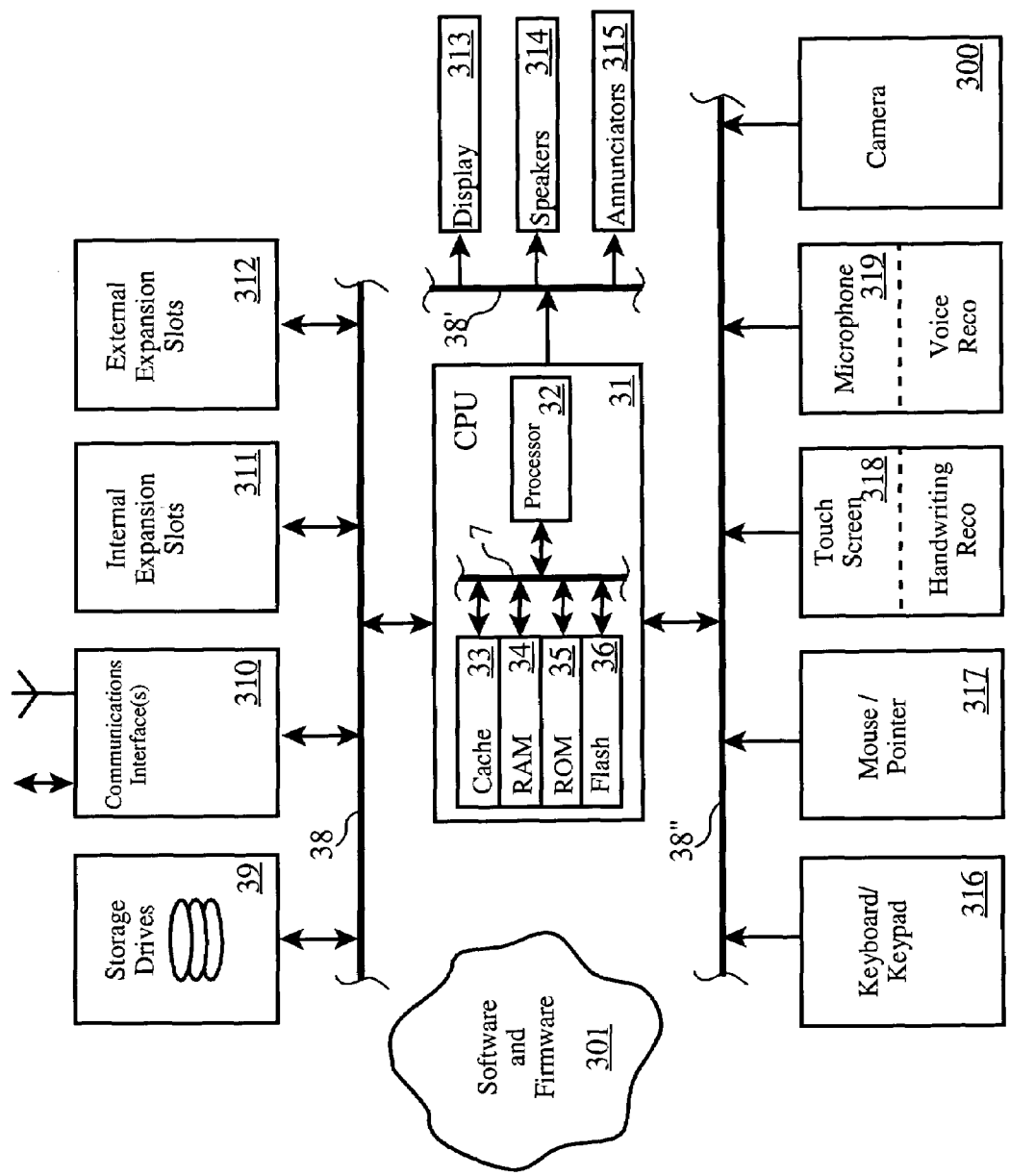
FIG. 3 depicts a generalized computing platform architecture, such as a personal computer, server computer, personal digital assistant, web-enabled wireless telephone, or other processor-based device.

Turning to FIG. 3, a generalized architecture is presented including a central processing unit (31) ("CPU"), which is typically comprised of a microprocessor (32) associated with random access memory ("RAM") (34) and read-only memory ("ROM") (35) and other types of computer-readable media. Often, the CPU (31) is also provided with cache memory (33) and programmable FlashROM (36). The interface (37) between the microprocessor (32) and the various types of CPU memory is often referred to as a "local bus", but also may be a more generic or industry standard bus.

Many computing platforms are also provided with one or more storage drives (39), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (311), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (300), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or annunciators (315) are often associated with computing platforms, too. The speakers (314) may be used to reproduce audio and music, such as the speaker of a wireless telephone or the speakers of a personal computer. Annunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (301) programs to implement the desired functionality of the computing platforms.

Figure 4:
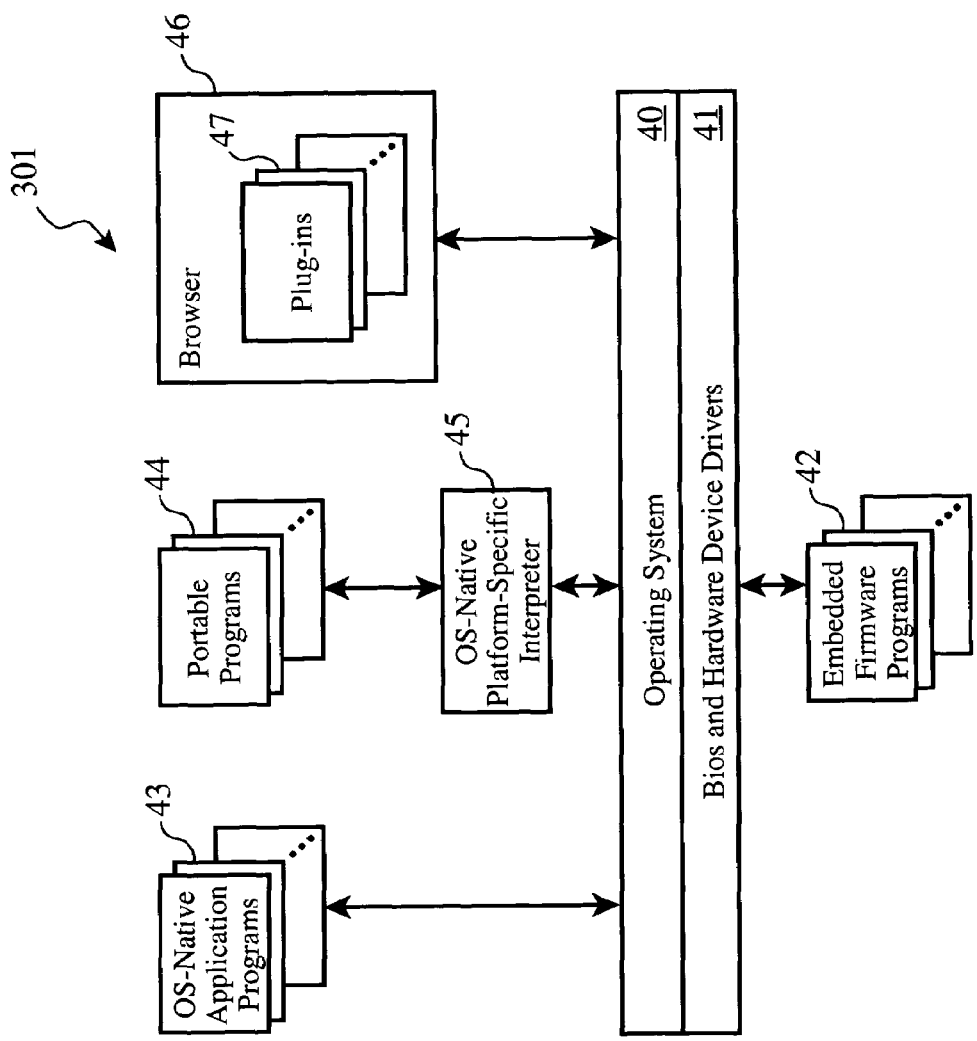
FIG. 4 shows a generalized organization of software and firmware associated with the generalized architecture of FIG. 1.

Turning now to FIG. 4, more detail is given of a generalized organization of software and firmware (301) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or micro-browser (46), which may also include one or more extensions to the browser such as browser plug-ins (47). If the computing platform is configured as a networked server, well-known software such as a Hyper Text Transfer Protocol ("HTTP") server suite and an appropriate network interface (e.g. LAN, T1, T3, etc.) may be provided.

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Speaker's Computing Platform

Figure 5:
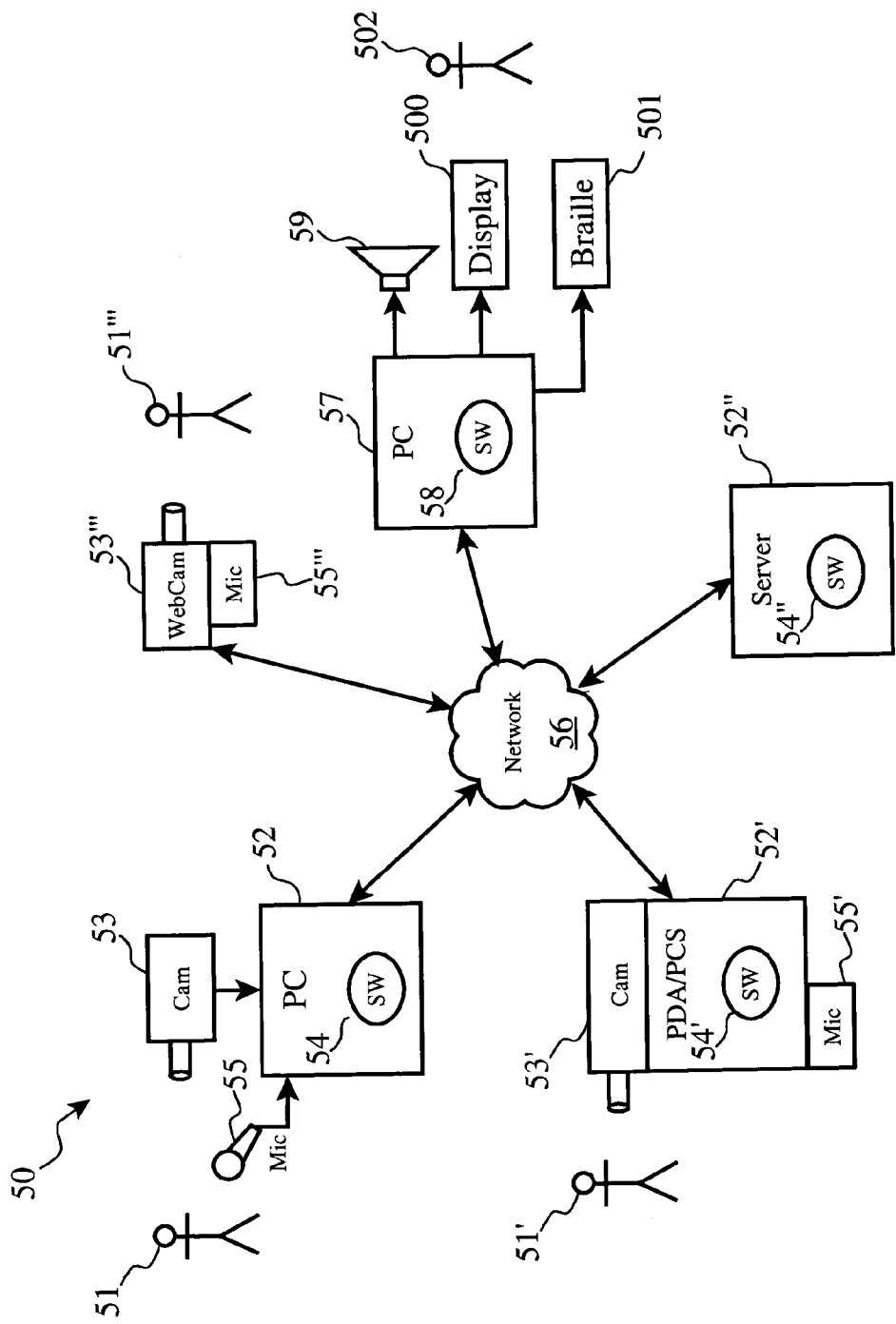
FIG. 5 illustrates some of the configurations of embodiments of the invention.

The functionality of the present invention can be realized in a single computer platform or in multiple platforms (50), as shown in FIG. 5. In a first possible configuration, a PC (52) is equipped with a camera (53) and microphone (55) for a first speaker/participant (51), and with the functionality of the present invention embodied in a first software program (54), applet, or plug-in. In this manner, the visual and audible presentation from the speaker (51) is combined with gesture and facial expression information determined by the software program (54) before it is transmitted over a computer network (56) (e.g. the Internet, and intranet, a wireless network, etc.) to a recipient's computer (57).

The recipient's computer (57) is preferably equipped with a second software program (58), applet, subroutine or plug-in, which can provide the combined information in a display (500), audio speaker (59), or alternate output device (501) such as a Braille terminal, a Terminal Device for the Deaf (TDD), etc. In this configuration, both speaker's computer and the recipient's computer are fully implemented with the present invention, and no additional "help" is required by any other systems.

Similarly, another speaker's (51') computer (52') may be a PDA, wireless phone, or other networked portable computer equipped with suitable software (54') and a camera (53') and a microphone (55'). Interoperations with this speaker's computer and the recipient's computer is similar to that previously described with a PC-based platform.

In yet another configuration option, a webcam (53''') (with integral microphone (55''')) is interfaced directly to the computer network (56). Webcams are special devices which integrate a digital camera and a small Internet terminal or server. They can send still images and video to other devices over the network without the need for an external computer such as a PC. In reality, many of them include within their own housing or package a basic PC or PDA type of computer which is pre-configured for the limited functionality of a webcam. In this configuration, a server computer (52'') may include the software (54'') which merges the audio, visual and emotional information received from the web cam such that the webcam need not be upgradable to include the special software of the present invention. Interoperations with this speaker's (51''') webcam and the recipient's computer is similar to that previously described with a PC-based platform, with the exception of the fact that the recipient's computer (57) interacts with the server (52'') as an intermediary to the webcam.

In another variation of these configurations, a server (52'') may also provide the needed functionality for the recipient (502) so that the recipient's computer (57) need not include special software (58), thereby allowing the invention to be realized for various terminal devices which may not be able to be upgraded or may not have the computing power needed for the recipient-end processing (e.g. a WebTV unit or low end PDA).

Process of Generating and Merging Emotional Information

Figure 6:
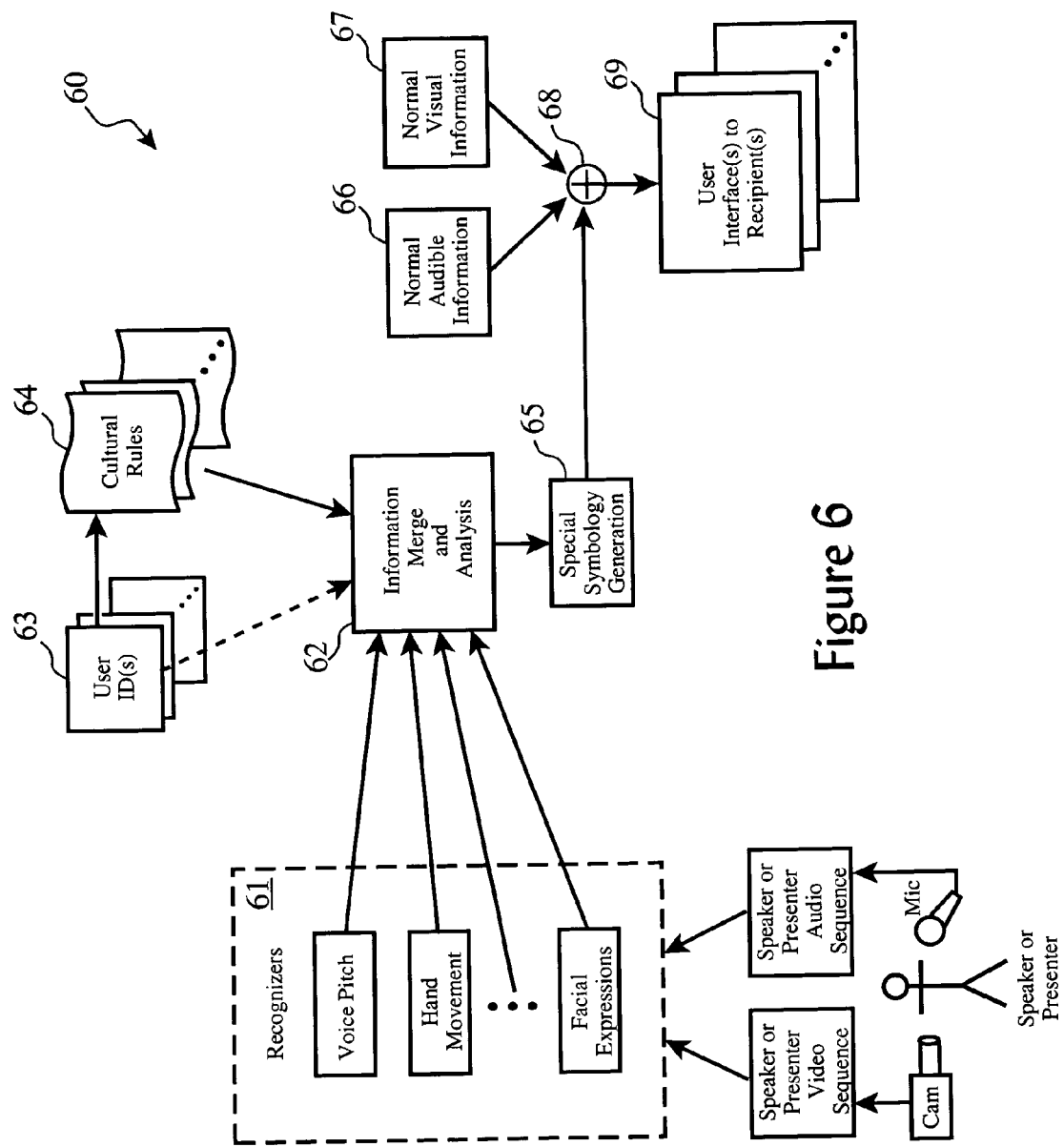
FIG. 6 sets forth a generalization of our new process for generating emotional content symbols, and merging it with the traditional audio and/or visual content of a communication session is shown.

Turning now to FIG. 6, our generalized process (60) of generating symbols which represent emotional content, and merging them with the traditional audio and/or visual content of a communication session is shown.

Any number of the previously described recognizers (61) such as a hand movement recognizer, a voice pitch analyzer, or facial expression recognizer may be employed, individually or in combinations, including types not shown. Each of these emotional content recognizers may be implemented on a networked server, or within the same program as the other functions of the invention, as shown in FIG. 6. As such, their results may be received by the present invention through any suitable computer-readable communication means, such as an Internet message, a local-area network message, a value passed through computer memory, etc. Hand movement recognizers, voice pitch analyzers, and facial expression recognizers are available from a variety of university and commercial sources, as well as taught by the aforementioned US patents. Many of these systems are suitable for integration into the present invention.

Each emotional content analyzer provides a specific analysis on voice samples or image samples from the speaker. For example, a facial expression analyzer would receive as input a series of digital images of the speaker (e.g. a video clip), and would provide a result such as "happy", "sad", "confused", "emphatic", "positive acknowledgement/agreement", "disagreement", etc. A hand gesture recognizer would also receive a video clip in which the speaker's hands are shown, and would provide a result such as "counting 1", "counting 2", "emphatic", "motioning negative/no", "motioning agreement/yes", etc. A voice pitch analyzer would receive a digital audio clip of the speaker's speech, and would return a result such as "statement", "strong statement—excited", "question/inquiry", "speech pause/slow down", etc. T.

The analysis results of the emotional content analyzer(s) (61) are provided to an analysis and merging engine (62), either directly as data and parameters, or via a messaging scheme suitable for interprocess communications and/or suitable for network communications (e.g. TCP/IP, etc.). The user (current speaker) for which the emotion is being determined is identified (63), and preferably a set of cultural rules (64) for interpreting that user's facial expressions, intonation and body gestures are accessed. This allows for differences from one culture to another (or one level of handicap to another) to be considered in the generation of the special symbology of the intended recipient(s) (600). As such, there should be a user ID for the present speaker with a corresponding set of cultural rules, as well as a user ID for each intended recipient and a corresponding set of cultural rules.

For example, consider a conference in which the participant who is presently speaking is French, and in which a first audience member is American. Further assume that a second audience member is blind. In French culture, when a person is articulating a numbered list, the speaker begins the count at 1 and typically holds up a thumb, as shown in FIG. 7a. Then, when he proceeds to the second point, the thumb and pointer finger are extended, as shown in FIG. 7b. In American culture, however, such counting would start with the index finger for number 1 (FIG. 7c), proceeding to extending the index and the middle finger for number 2, through to the extending the little finger for 4 and the thumb for 5 (with all previous fingers remaining extended). For the American, a single extended thumb does not signify number 1, but instead indicates agreement, "good" or "OK".

So, using the cultural list, when the French speaker is determined to have extended a thumb, an emotional symbol may be generated to the American recipient to indicate "first" or number 1 in a list. For the blind recipient, a symbol may be generated indicating first or number 1 either in an audible annotation or on a Braille output.

When the American participant (or the blind participant) begins to act as the speaker with the French participant as an audience member, the analysis and symbol generation may be essentially reversed. For example, when the American articulates with a single pointer finger extended, a symbol to the French recipient is generated indicating "first" or "number one".

Figure 7:
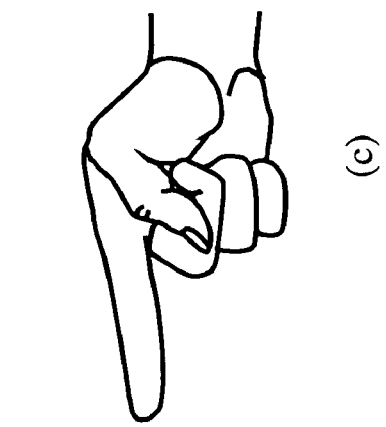
FIG. 7 shows such a cultural difference in hand gestures.
Figure 7:
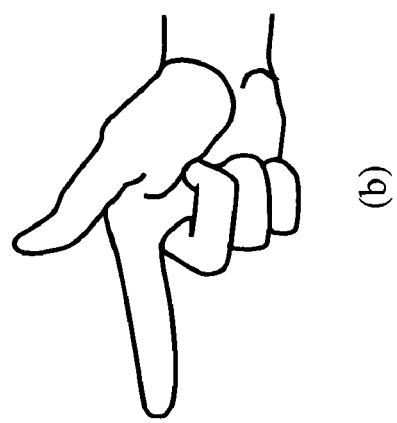
Figure 7:
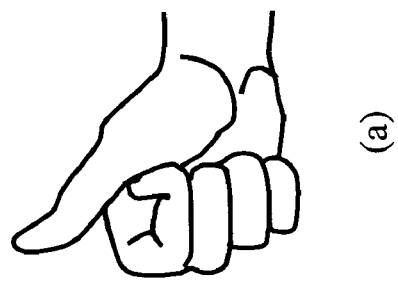

FIG. 7 shows such a cultural difference in hand gestures, wherein:

(7a) single thumb extended in France means "number one" or "first", and in America means "OK" or "agreed";

(7b) thumb and pointer finger extended in France means "second" or "number two", and in America means "gun" or "looser", and (7c) single pointer finger in France means "particularly you" with a somewhat rude connotation (e.g. emphatic, often with anger), and in America means "first" or "number one".

In a second example, the voice pitch of the present speaker can be analyzed to determine special symbols which may be useful to the intended recipient to better understand the communication. For example, in traditional German speech, a volume or voice pressure emphasis is placed on the most important word or phrase in the spoken sentence, while in American, an emphasis is often placed at the beginning of each sentence. Consider, for instance, several different intonation, pitch and sound pressure emphasis patterns for the same phrase, shown below in English. Each of these phrases, when spoken with emphasis on the underlined portions, have different interpretations and nuances when spoken in German or English:

(1) You must pay the attendant before boarding the train.
(2) You must pay the attendant before boarding the train.
(3) You must pay the attendant before boarding the train.
(4) You must pay the attendant before boarding the train?

Figure 8:
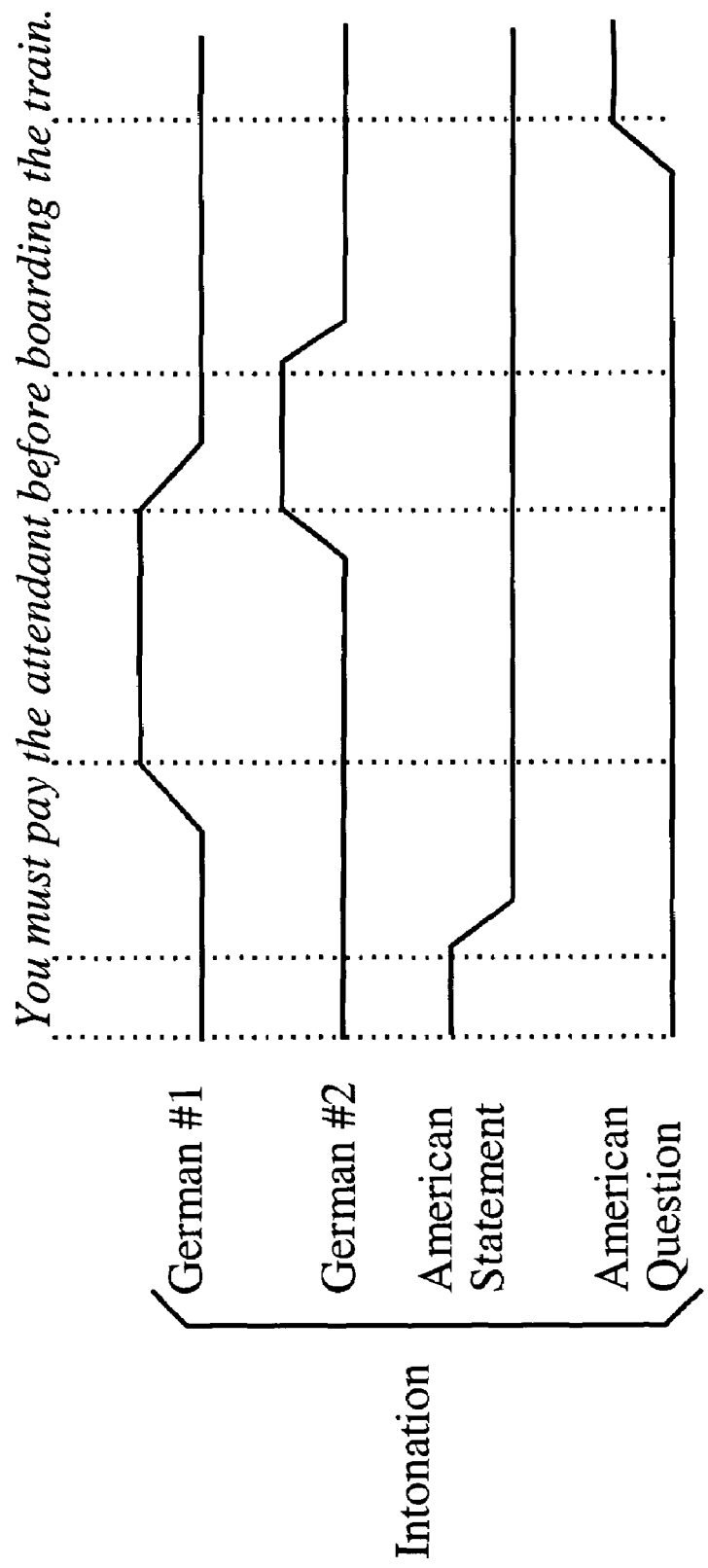
FIG. 8 shows cultural differences in intonation and emphasis of a spoken phrase.

In phrase (1), a German speaker is indicating who should be paid, and in phrase (2), when the payment must be made. In phrase (3), an American speaker is using a slight emphasis at the beginning of the first word, which indicates the start of a new phrase. The American interrogation intonation shown in phrase (4) has an emphasis on the last few syllables of the phrase to indicate a question has been asked. FIG. 8 graphically depicts these emphasis schemes.

As such, if voice pitch analysis is employed in a communication from a German speaker to a deaf American, the text shown to the American may be modified in a manner culturally recognized by the American to indicate emphasis, such as underlining (as just shown), "all caps", bolding, special font coloring, font size increase, etc.

Returning to FIG. 6, the results of the emotional content analyzers (61) are received and analyzed (62) to determine an overall emotional state of the speaker. For example, if hand gesture analysis results indicate agreement, but facial expression analysis and voice pitch analysis results indicate dissatisfaction, a weighted analysis may determine a generally (overall) unhappy emotion for the speaker.

Next, special symbology is generated based upon the intended recipient's cultural rules and terminal type. For example, if the recipient is a fully capable person (hearing, seeing, etc.), text-based emoticons such as a happy face :-) or sad face :-( or graphic images for the same may be inserted (68) into the stream of text, within the visual presentation, etc. If the recipient is deaf and receiving a text stream only, text emoticons may be inserted, emphasis markings made (e.g. underlining, bolding, etc.), and the like.

Finally, the normal audio portion (66), the normal visual portion (67) and the new emotional content are merged for transmission or presentation to the recipient(s) via their particular user interface(s).

Figure 9:
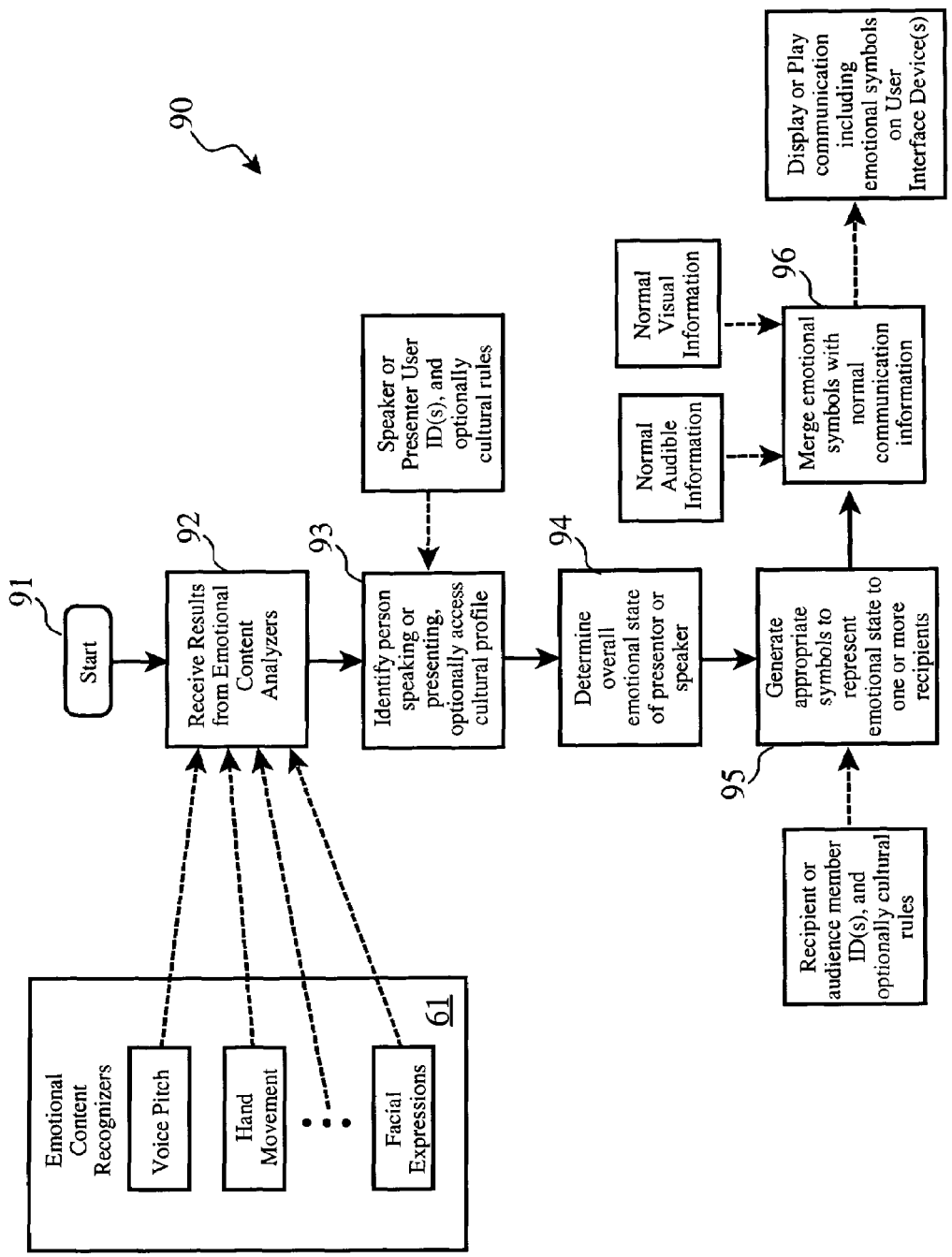
FIG. 9 provides one example embodiment of a logical process according to the present invention.

FIG. 9 illustrates a logical process (90) according to the present invention, which starts (91) with receiving (92) results from one or more emotional content analyzers such as a voice pitch analyzer, a hand movement analyzer, or facial expression recognizer. These results may be received via interprocess communications, such as by return variables, or via data communications such as a message over a computer network. The person speaking or presenting is then identified (93), and optionally a set of cultural rules needed to interpret the emotional state of the person are accessed.

The overall emotional state of the speaker or presenter is determined (94) by comparing, combining, weighting, or otherwise analyzing the emotional recognizer results. For example, if facial recognition indicates happiness, but hand gesture and voice pitch indicate anger, an overall emotional state may be determined to be anger.

The intended recipient or recipients are then identified (95), and cultural profiles for each of them are optionally accessed, in order to determine appropriate symbols to reflect the overall emotional state of the speaker or presenter. For example, for a blind recipient, a Braille code may be generated, and for a web browser user, a graphical emoticon may be generated.

Finally, these symbols are merged (96) with the normal communications information such as the audio stream, data stream, text stream, or video stream from the presenter or speaker. This enhanced information, including the emotional symbols, is then presented to the recipient or recipients using their user interface device(s) (e.g. computer display, TV screen, speaker, headphones, Braille terminal, TDD display, etc.).

Modes of Interfacing

In summary, many general modes of interfacing a particular speaker to a particular recipient are enabled by the present invention:

(a) impaired user to unimpaired user;
(b) unimpaired user to impaired user;
(c) a first user to a second user of a different culture;
(d) a user having a first terminal type to a second user having a second terminal type.

In the first mode, an impaired user such as a deaf or blind person is interfaced to a hearing or seeing person. In the second mode, the reverse interface is provided.

In the third mode, a person from one culture (e.g. American) is interfaced to a person of another culture (e.g. Japanese, French or German).

In the fourth mode, a user having one type of terminal such as an Internet browser with high-speed connection and full-video capability can interface to a user having a terminal with different capabilities such as a text-only device.

These modes are not mutually exclusive, of course, and can be used in combination and sub-combination with each other, such as a French deaf person equipped with a full-video terminal communicating to a hearing American with a text-only device, and simultaneously to a Japanese participant who is blind equipped with a Braille terminal.

CONCLUSION

A flexible method and system architecture have been disclosed which allows the emotional aspects of a presentation to be merged and communicated to one or more recipients, including capabilities to limit or augment the merged presentation to each recipient based upon cultural differences, technical differences, and physical impairment differences between each recipient and a speaker or present.

It will be readily realized by those skilled in the art that certain illustrative examples have been presented in this disclosure, including one or more preferred embodiments, and that these examples to not represent the full scope and only possible implementations of the present invention. Certain variations and substitutions from the disclosed embodiments may be made without departing from the spirit and scope of the invention. Therefore, the scope of the invention should be determined by the following claims.

What is claimed is:

1. A computer-implemented method comprising the steps of:

receiving an emotional state indicator output from automatic emotional content analysis of a communication session, said emotional state indicator indicating an emotional state of a presenter of said communication session;

retrieving a cultural profile for said presenter;

retrieving a plurality of cultural profiles corresponding to each of a plurality of recipients to which said communication session is directed;

for each recipient to which said communication session is directed:

translating said emotional state indicator into a corresponding emoticon according to a difference between said cultural profile of said presenter and said cultural profile of said recipient;

merging said translated emoticon into a copy of said communication session; and presenting said communication session and merged translated emoticon to said recipient.

2. The computer-implemented method as set forth in claim 1 wherein said receiving output of emotional content analysis comprises receiving the results of a process selected from group consisting of a hand gesture recognizer, a body movement recognizer, a voice pitch analyzer, and a facial expression recognizer.

3. The computer-implemented method as set forth in claim 1 wherein said translating comprises generating an electronic symbol selected from the a group consisting of a text-based emoticon, a graphical emoticon, a text highlight method, a text size change, a text underlining method, a text bolding method, one or more signals for a Telephone Terminal for the Deaf system, and a Braille code.

* * * * *

UNITED STATES PATENT AND TRADEMARK OFFICE
CERTIFICATE OF CORRECTION

PATENT NO. : 7,607,097 B2
APPLICATION NO. : 10/671081
DATED : October 20, 2009
INVENTOR(S) : Janakiraman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Fourteenth Day of December, 2010

David J. Kappos
*Director of the United States Patent and Trademark Office*